(12) United States Patent
Bastioli et al.

(10) Patent No.: US 7,169,860 B2
(45) Date of Patent: Jan. 30, 2007

(54) AMORPHOUS-CRYSTALLINE BLOCK COPOLYMERS

(75) Inventors: Catia Bastioli, Novara (IT); Giandomencio Cella, Novara (IT); Tiziana Milizia, Novara (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 10/967,299

(22) Filed: Oct. 19, 2004

(65) Prior Publication Data

US 2005/0107572 A1 May 19, 2005

Related U.S. Application Data

(63) Continuation of application No. PCT/EP03/04070, filed on Apr. 22, 2003.

(30) Foreign Application Priority Data

Apr. 22, 2002 (IT) .......................... MI2002A0864

(51) Int. Cl.
*C08F 20/00* (2006.01)
*B29D 22/00* (2006.01)

(52) U.S. Cl. .................... 525/444; 528/295.3; 528/296; 528/300; 528/301; 528/302; 528/306; 528/308; 528/308.6; 528/354; 525/437; 525/445; 525/450; 428/35.4; 428/35.7; 428/221; 428/364

(58) Field of Classification Search ................ 528/272, 528/295.3, 296, 300, 301, 302, 306, 308, 528/308.6, 354; 525/437, 444, 445, 450; 428/35.4, 35.7, 221, 364
See application file for complete search history.

(56) References Cited

U.S. PATENT DOCUMENTS 3,968,183 A 7/1976 Hayashi et al.
4,070,417 A 1/1978 Isaka et al.
5,455,311 A * 10/1995 Grigat et al. ................ 525/439

FOREIGN PATENT DOCUMENTS

EP 1 024 162 B1 8/2000
WO WO-00/55236 9/2000

* cited by examiner

*Primary Examiner*—Samuel A. Acquah
(74) *Attorney, Agent, or Firm*—Connolly, Bove, Lodge & Hutz, LLP

(57) ABSTRACT

Biodegradable block copolyesters obtained from crystalline blocks and amorphous blocks, wherein the repeating units of both blocks are of the dicarboxylic acid/diol type. Said copolyesters are characterized by a melting temperature equal to or less than 15% lower than the starting crystalline polymer temperature, and by increased tenacity that makes them particularly useful in the production of different types of objects.

13 Claims, 1 Drawing Sheet

AMORPHOUS-CRYSTALLINE BLOCK COPOLYMERS

Figure 1:
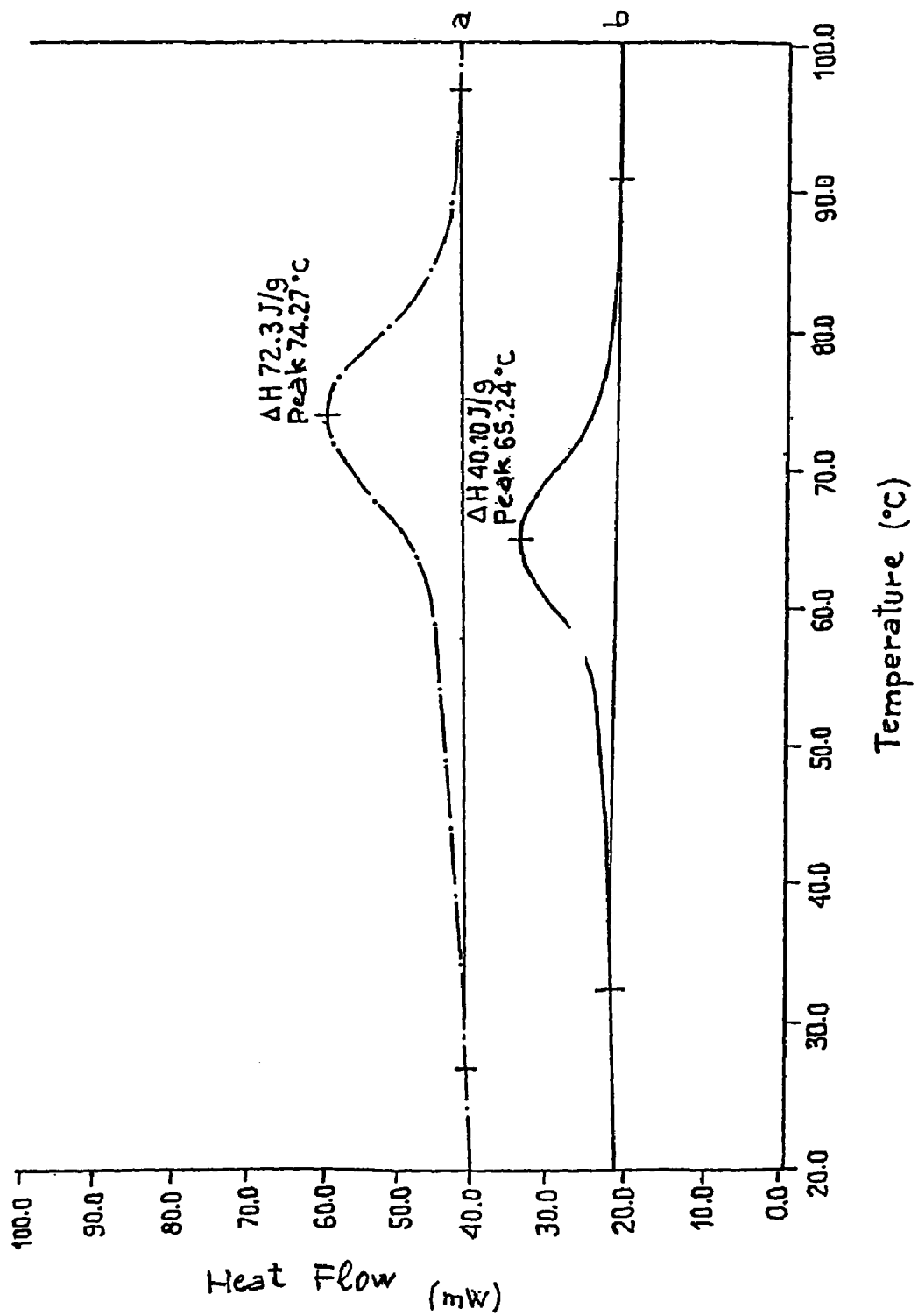

This application is a Continuation of PCT/EP03/04070 filed Apr. 22, 2003, which in turn claims priority from Italian Application MI2002A000864, filed Apr. 22, 2002.

DESCRIPTION

The present invention relates to biodegradable block copolyesters made of crystalline blocks and amorphous blocks, wherein the repeating units of both blocks are of the dicarboxylic acid/diol type. Said copolyesters are characterized by a melting temperature equal to, or less than 15% lower, than the melting temperature of the starting crystalline polymer, and by an increased strength that makes them particularly useful in the production of different types of articles.

Biodegradable polyesters of the dicarboxylic acid/diol type are known. For instance, WO 00/55236 discloses a simplified process for the production of a biodegradable aliphatic polyester of the diacid/diol type, without however describing examples of copolyesters made of crystalline blocks and amorphous blocks. Hence, the problem of obtaining a biodegradable polyester with a sufficiently high melting point and, at the same time, improved tenacity characteristics that make it suitable for several practical applications remains unsolved.

An adequate solution of the aforesaid problem has been surprisingly found with the copolyester according to the invention, that is characterized by filmability and tenacity properties that allow its use in several practical applications, such as for instance, films for food packaging.

A polymer is called homopolymer when it is made of repeating units of only one type, while it is called copolymer when different types of repeating units are present in the polymer chain. In a random copolymer, the repeating units may be present in any order, while in a block copolymer repeating units of the same type are grouped along the chain. Therefore, a block copolymer is a copolymer wherein the repeating units remain separate in long sections of the main polymeric chain.

The biodegradable block copolymer according to the invention is made of crystalline blocks and amorphous blocks formed starting from at least a crystalline polymer and at least an amorphous polymer, each of them being of the dicarboxylic acid/diol type, and is characterized by a melting point $T_{mA}$, referred to the crystalline part, which is equal to or less than 15% lower than the melting temperature of the crystalline polymer, and by a melting point $T_{mB}$, referred to the amorphous part, to which a $\Delta H$ lower than 10 J/g is associated.

The crystalline polymer (of the diacid/diol type) that generates the crystalline part of the copolymer, is characterized by $\Delta H > 50$ J/g, $T_m > 60°$ C. and $M_n$ (mean numeric molecular weight)>25,000. The amorphous polymer (of the diacid/diol type) that generates the amorphous part of the copolymer is characterized by $\Delta H \leq 30$ J/g and a $T_g$ lower than 0° C., preferably lower than $-10°$ C.

In the copolymer according to the invention, the amorphous polymer is present in an amount within the range from 1 to 70% based on the total amount of amorphous polymer+crystalline polymer, preferably from 5 to 65% and more preferably from 10 to 60%.

With reference to the constituents of the amorphous and crystalline blocks of the copolymer according to the invention, examples of dicarboxylic acid include oxalic, malonic, succinic, glutaric, adipic, pimelic, suberic, azelaic, sebacic, undecanedioic, dodecanedioic and brassylic acids.

Examples of diols include 1,2-ethandiol, 1,2-propandiol, 1,3-propandiol, 1,4-butandiol, 1,6-hexandiol, 1,7-heptandiol, 1,8-octandiol, 1,9-nonandiol, 1,10-decandiol, 1,11-undecandiol, 1,12-dodecandiol, 1,4-cyclohexandimethanol, neopentylglycol, 2-methyl-1,3-propandiol, dianhydrosorbitol, dianhydromannitol, dianhydroiditol, cyclohexandiol, cyclohexanmethandiol.

Amorphous or low crystallinity polyesters of the dicarboxylic acid/diol type according to the meaning of the present invention, i.e. having a $\Delta H$ lower than 30 J/g, may be advantageously obtained by using diacids/diols that cannot crystallize because of structure symmetry or steric hindrance (such as, for instance, neopentylglycol, 1,3-butanediol, diethylene glycol) or by using high percent of different comonomers (e.g., copolymers of sebacid acid, azelaic acid, and butanediol with a high content of azelaic acid).

In addition to the dicarboxylic acid and the diol, the biodegradable copolyester according to the invention may advantageously comprise as starting monomer also an unsaturated comonomer of either natural or synthetic origin. The amount of unsaturated comonomer is within the range of 0.5 to 45% of the sum dicarboxylic acid/diol.

Examples of unsaturated acids of synthetic origin include malonic acid, fumaric acid, vinyl acetate, acrylic and methacrylic acids, hydroxyalkylacrylates and hydroxyalkylmethacrylates. Examples of unsaturated comonomers of natural origin are itaconic acid, monounsaturated hydroxyacids, such as ricinoleic acid and lesquerolic acid, and mono-, or polyunsaturated monocarboxylic acids, such as oleic, erucic, linoleic, linolenic acids. The unsaturated acids of natural origin may be used either in the pure form or mixed with other fatty acids, saturated or unsaturated. In particular they may be used as blends obtained from saponification or transesterification of the vegetable oils which they originate from. For instance, ricinoleic acid, in the form of methylricinoleate, may be utilized in a more or less pure form deriving from a transesterification reaction of castor oil with methanol, and subsequent removal of glycerin (a reaction byproduct) and excess methanol.

The copolymer according to the invention may include, in addition to the base monomers, at least a hydroxy acid in an amount in the range from 0 to 30% moles based on the moles of the aliphatic dicarboxylic acid. Examples of suitable hydroxy acids include glycolic acid, hydroxybutyric acid, hydroxycaproic acid, hydroxyvaleric acid, 7-hydroxyheptanoic acid, 8-hydroxycaproic acid, 9-hydroxynonanoic acid and lactic acid.

Also advantageously, the biodegradable copolymer according to the invention may comprise, as starting monomer, also up to 50% moles, based on the sum dicarboxylic acid/diol, of a polyfunctional aromatic compound such as, for instance, a phthalic acid, in particular terephthalic acid, bisphenol A, hydroquinone and the like.

Moreover, the copolymer according to the invention may be used in blends obtained also by reactive extrusion either with copolymers of the same type or with other biodegradable polyesters (for instance polylactic acid, poly-ε-caprolactone, polyhydroxybutyrate, polyalkylensuccinates) or polymers other than polyesters; it may also be used in blends with polymers of natural origin, such as, for instance, starch, cellulose, chitosan or natural rubber. Starches and celluloses may be modified and among them, it is possible to mention, for instance, starch or cellulose esters with a substitution degree between 0.2 and 2.5, hydroxypropylated starches, and starches modified with fatty chains. Besides, starch may be used either in the destructurized or in the gelatinized form.

In the preparation process of the polyester according to the invention one or more polyfunctional molecules may advantageously be added in an amount within the range from 0.1 to 3% moles based on the dicarboxylic acid, in order to obtain branched products. Examples of these molecules include glycerol, pentaerythritol, trimethylolpropane, neopentylglycol, citric acid, densipolic acid, auripolic acid, epoxydized soybean oil and castor oil.

The block copolymers according to the invention are obtained starting from at least two polymers of the dicarboxylic acid/diol type, one crystalline and the other amorphous, for instance by exchange reaction (transesterification) between the polymers. In this case, it is important to suitably modulate the reaction time because the extension of the latter involves an increase in the exchanges between the polymer chains that may result in the formation of random copolymers.

It is also possible to obtain block copolymers according to the invention by post-polymerization reactions of the mixture of the at least two starting polymers through reactive extrusion with organic peroxides.

The block copolymers according to the invention are suitable to be used in many practical applications such as films, injection molded products, extrusion coating, fibers, foams, thermoformed products, etc. In particular, copolymers according to the invention are suitable for the production of:

- films, either mono- or bidirectional, and multi-layer films with other polymeric materials;
- films for use in agriculture, such as mulching films;
- bags and liners for organic waste collection;
- mono- or multi-layer food packaging, such as for instance containers for milk, yogurt, meat, drinks, etc;
- coatings obtained by the extrusion coating technique;
- multi-layer laminates with layers from paper, plastics, aluminum, metalized films;
- expanded and semi-expanded products, including expanded blocks obtained from pre-expanded particles;
- expanded sheets, thermoformed sheets and containers obtained therefrom for food packaging;
- containers in general for fruits and vegetables;
- composites with gelatinized, destructurized and/or complexed starch or natural starch for use as a filler;
- fibers, fabrics and nonwoven fabrics for the sanitary and hygiene sector.

EXAMPLES

In the examples, inherent viscosity is measured at 25° C. in chloroform, at a concentration of 0.2 g/dl.

Melting Temperature $T_m$ and Melting Enthalpy $\Delta H_m$ were measured with a Perkin Elmer DSC 7 differential scanner calorimeter provided with a liquid nitrogen cooling system. The instrument is calibrated with a high purity standard (indium). About 10 mg polymer are placed in an aluminum capsule and heated to a temperature about 40° C. higher than the melting temperature, at a speed of 20° C./min ($1^{st}$ scanning), then cooled to −30° C. and lastly brought again to a temperature higher than the temperature of complete melting of the polymer, at a scanning speed of 20° C./min (2 scanning). $T_m$ and $\Delta H_m$ values were obtained from the thermogram of the second scanning, in order to have a uniform thermal history of the samples. The melting temperature was determined as the peak value of the endothermic phenomenon of the DSC curve, and enthalpy was obtained from the area of the same peak.

Formation of the copolymer is detected by dynamic-mechanical analysis and calorimetric analysis. Unless otherwise indicated, the tear strength of the film is measured according to ASTM D-882/88 15 days after film formation.

Example 1

Semi-Crystalline Polymer (Polyethylene Sebacate)

5.7 kg sebacic acid (2.2 moles), 2.0 kg ethylene glycol (32.2 moles), 6 g monobutylstannoic acid ($2.9 \cdot 10^{-2}$ moles)

were fed to a 25 l steel reactor provided with mechanical stirrer, nitrogen inlet, condenser and a connection with a vacuum pump.

The temperature was gradually increased to 210° C. under vigorous stirring and nitrogen flow. The reaction was carried on until 89% of the theoretical amount of light byproducts was distilled (900 ml). The temperature was then increased to 240° C. and a pressure of 0.5 mmHg was applied to the system. The reaction was continued for 300 min.

A product is obtained with an inherent viscosity of 1.11 dl/g, $T_m=74.27°$ C., $\Delta H_m=72.3$ J/g and $T_g=-36°$ C.

Amorphous Polymer (Polyneopentylsebacate)

To the above reactor 5050 g sebacic acid (25.0 moles), 2700 g neopentylglycol (26.0 moles), 8 g monobutylstannoic acid ($3.8 \cdot 10^{-2}$ moles).

were fed.

The temperature was gradually increased to 210° C. under vigorous stirring and nitrogen flow. The reaction was carried on until 87% of the theoretical amount of light byproducts was distilled (780 ml). The temperature was then increased to 240° C. and a pressure of 0.2 mmHg was applied to the system. The reaction was carried on for 300 min.

The product is an amorphous polymer at $T_{amb}$ (room temperature) that shows no melting peak at the DSC analysis, with inherent viscosity of 1.2 dl/g, and $T_g=-62°$ C.

Block Copolymer

The block copolymer was obtained in a pilot reactor by transesterification reaction of the above described polyethylene sebacate and polyneopentylensebacate.

4.8 kg polyethylene sebacate (60% wt) and 3.2 kg (40% wt) polineopentylensebacate were fed to the reactor and heated to 230° C. Once the polymers were melt, the mixture was stirred for 30 minutes at 240° C. under a vacuum of 0.5 mm Hg.

A product having viscosity=1.05 dl/g, $T_m=65.24°$ C., $\Delta H_m=52$ J/g and a single $T_g=-50°$ C. is obtained.

FIG. 1 shows the thermograms of the crystalline polymer (a) and of the block copolymer (b). The figure graphically highlights that the decrease of the melting point of the copolymer with respect to that of the crystalline polymer is less than 15%. The $\Delta H$ associated to the amorphous part of the copolymer is 0.

With the block copolymer thus obtained, films having thickness of 25 μm were produced by film blowing the polyethylene sebacate and the block copolymer.

Tear strength (Elmendorf) is shown in the table below:

| Example 1 | Longitudinal Direction (N/mm) | Transversal Direction (N/mm) |
|---|---|---|
| Polyethylene sebacate | 3 | 20 |
| Block copolymer | 3 | 47 |

When measuring the Elmendorf value after 1 year, the block copolymer gives always the same value, while polyethylene sebacate gives 3 N/mm in the longitudinal direction but 12 N/mm in the transversal direction.

Comparative Example 1

Solution Blending of the Two Polymers 6 g polyethylene sebacate (60%) and 4 g polyneopentylensebacate (40%) of example 1 were dissolved in 100 ml chloroform at 25° C. under stirring for 30 min. The major part of the solvent was vacuum evaporated (18 mm Hg) in rotovapor. The obtained mixture was dried in a vacuum oven at 40° C. for 24 hours. In this way, the two products are mixed without any reaction.

The product obtained has $T_m$=72° C. and shows two $T_g$ at −36° C. and −48° C.

Comparative Example 2

Extrusion Blending of the Two Polymers 180 g polyethylene sebacate (60%) and 120 g polyneopentylensebacate (40%) of example 1 were blended in a Haake Rheocord extruder with metering screw, full mouth feeding at 25 rpm and with the following temperature profile: 25-50-80-90-100° C.

The resulting mixture has $T_m$=72° C. and shows two $T_g$ at −60° C. and −50° C.

The polymer of example 1, unlike the two mixtures described in the comparative examples, has a single $T_g$. Therefore, it is a copolymer and not a blend.

Comparative Example 3

Random Copolymer 202 g sebacic acid (1 mole)
44 g ethylene glycol (0.7 mole)
41 g neopentylglycol (0.4 mole)
0.3 g monobutylstannoic acid were fed to a 1.5 l Pirex glass reactor provided with mechanical stirrer, nitrogen inlet, condenser and a connection with a vacuum pump.

The ethyleneglycol/neopentylglycol ratio is such as to obtain 60% wt repeating units of polyethylene sebacate and 40% wt repeating units of polyneopentylensebacate. The temperature of the reactor was gradually increased to 210° C. under vigorous stirring and nitrogen flow. The reaction was carried on until 90% of the theoretical amount of light byproducts was distilled (32 ml). The temperature was then increased to 240° C. and a pressure of 0.5 mmHg was applied to the system. The reaction was continued for 240 min.

The product is a polymer with inherent viscosity of 1.15 dl/g and $T_m$=35° C. This result shows that the copolymer described in Example 1 is not a random copolymer.

Example 2

Semi-Crystalline Polymer (Polybutylene Sebacate)
7079 g sebacic acid (35 moles),
3470 g butandiol (38.6 moles)
10.8 g monobutylstannoic acid ($5.2 \times 10^{-2}$ mole)

were fed to a 25 l steel reactor provided with mechanical stirrer, nitrogen inlet, condenser and a connection with a vacuum pump.

The temperature was gradually increased to 210° C. under vigorous stirring and nitrogen flow. The reaction was continued until 91% of the theoretical amount of light byproducts was distilled (1150 ml). The temperature was then increased to 240° C. and a pressure of 0.8 mmHg was applied to the system. The reaction was continued for 300 min. Polybutylensebacate with inherent viscosity of 1.11 dl/g, $T_m$=66° C. and $\Delta H_m$=90 J/g is obtained.

Amorphous Polymer (Polyneopentylensebacate)
Polyneopentylensebacate was synthesized according to what disclosed by Example 1.

Block Copolymer
The block copolymer was obtained by transesterification reaction of polybutylensebacate and polyneopentylensebacate in a pilot reactor.

6.0 kg polybutylensebacate (60% wt) and 4.0 kg (40% wt) polyneopentylensebacate were fed to the reactor and heated to 230° C. Once the polymers were melt, the mixture was stirred at 240° C. under a 0,5 mmHg vacuum for 90 min.

A product having a inherent viscosity of 1.31 dl/g, $T_m$=62° C. and $\Delta H_m$=58 J/g is obtained. With said product, films having a thickness of 30 μm were made by blow filming of polyethylenesebacate and of the block copolymer.

Tear strength (Elmendorf) is shown in the table below:

| Example 2 | Longitudinal Direction (N/mm) | Transversal Direction (N/mm) |
|---|---|---|
| Polybutylenesebacate | 4 | 26 |
| Block copolymer | 5 | 180 |

Example 3

Semi-Crystalline Polymer (Polybutylene Sebacate)
Polybutylensebacate was prepared according to what disclosed in example 1.

Amorphous Polymer (Poly(butilen-co-neopentylensebacate) branched)
4000 g sebacic acid (19.8 moles)
878 g neopentyl glycol (8.4 moles)
1200 g butandiol (13.3 moles)
8 g monobutylstannoic acid ($3.8 \cdot 10^{-2}$ moles).

were fed to the above described reactor.

The temperature was gradually increased to 180° C. under vigorous stirring and nitrogen flow. The reaction was carried on until 85% of the theoretical amount of light byproducts was distilled. The temperature was then increased to 240° C. and a pressure of 0.2 mmHg was applied to the system. The reaction was continued for 360 min. The product is a polymer having inherent viscosity 1.13 dl/g, $T_m=32°$ C. and $\Delta H_m=30$ J/g.

Block Copolymer

The block copolymer was obtained by transesterification reaction of polybutylene sebacate and polybuthylene-co-neopentylensebacate in a pilot reactor. 6 kg polybuthylene sebacate (60% wt) and 4 kg (40% wt) polybutylene-co-neopentylensebacate were fed to the reactor and heated to 230° C. Once the polymers were melt, the mixture was stirred at 240° C. in a 0.5 mmHg vacuum for 90 min. A product having viscosity 1.16 dl/g, a single melting $T_m=59°$ C. and $\Delta H_m=70$ J/g is obtained.

With said product, films having a thickness of 30 μm were made by blow filming of the polybuthylene sebacate and of the block copolymers. Tear strength (Elmendorf) is shown in the table below:

| Example 3 | Longitudinal Direction (N/mm) | Transversal Direction (N/mm) |
|---|---|---|
| Polybutylene sebacate | 4 | 26 |
| Block copolymer | 5 | 150 |

Example 4

Semi-Crystalline Polymer (Polybutylensebacate)
  6000 g sebacic acid (29.7 moles)
  2940 g butandiol (32.7 moles)
  9 g monobutylstannoic acid ($4.3 \cdot 10^{31\ 2}$ moles)

were fed to the reactor of Example 1.

The temperature was gradually increased to 210° C. under vigorous stirring and nitrogen flow. The reaction was carried on until 95% of the theoretical amount of light byproducts was distilled. The temperature was then increased to 240° C., and a pressure of 1 mmHg was applied to the system. The reaction was continued for 120 min. 7 kg of a polymer having inherent viscosity of 0.84 dl/g were obtained. The polymer was filmed in Haake Rheocord.

Amorphous Polymer (Polyneopentylensebacate)
  5050 g sebacic acid (25.0 moles)
  2700 g neopentylglycol (26.0 moles)
  8 g monobutylstannoic acid ($3.8 \cdot 10^{-2}$ moles)

were fed to the reactor of Example 1.

The temperature was gradually increased to 210° C. under vigorous stirring and nitrogen flow. The reaction was continued until 87% of the theoretical amount of light byproducts was distilled (780 ml). The temperature was then increased to 240° C., and a pressure of 0.2 mmHg was applied to the system. The reaction was continued for 200 min. The resulting product is a polymer amorphous at room temperature, $T_{amb}$, that shows no melting peak at DSC analysis, with inherent viscosity of 0.87 dl/g.

Branched Block Copolymer

The amorphous crystalline copolymer was obtained by reacting 240 g polybutylensebacate and 160 g polyneopentylensebacate in an extruder with 0.3 pph 2,5-dimethyl-2,5-di-(tert-butyl)-peroxyhexane (Luperox 101) in the following conditions:
  temperature profile: 23-90-170-170-170° C.
  screw rotation speed: 200 rpm; throughput: 1.2 kg/h.

A polymer having viscosity 1.29 dl/g is obtained.

The product filmed in Haake Rheocord gives the following results:

| Example 4 | Longitudinal Direction (N/mm) | Transversal Direction (N/mm) |
|---|---|---|
| Polybutylene sebacate | 3 | 20 |
| Block copolymer | 10 | 30 |

The invention claimed is:

1. A biodegradable thermoplastic block copolymer made of crystalline blocks and amorphous blocks obtained from at least a crystalline polymer and at least an amorphous polymer, both of them of the dicarboxylic acid/diol type and characterized by a melting Point $T_{mA}$, referred to the crystalline part, which is equal to or less than 15% lower than the melting Temperature of the crystalline polymer, and by a melting Point $T_{mB}$ referred to the amorphous part, to which a $\Delta H$ lower than 10 J/g is associated.

2. The biodegradable thermoplastic block copolymer according to claim 1, wherein the crystalline polymer of the diacid/diol type, that originates the crystalline part of the copolymer, is characterized by $\Delta H>50$ J/g, $T_m>60°$ C. and $M_n>25,000$, and the amorphous polymer of the diacid/diol type, that originates the amorphous part of the copolymer, is characterized by $\Delta H \leq 30$ J/g and a $T_g$ lower than 0° C.

3. The biodegradable thermoplastic block copolymer according to claim 1, wherein the amount of amorphous polymer is within the range of 1 to 70% based on the total amount of amorphous+crystalline polymer.

4. The biodegradable block copolymer according to claim 1, wherein the dicarboxylic acid is selected from the group consisting of oxalic acid, malonic acid, succinic acid, glutaric acid, adipic acid, pimelic acid, suberic acid, azelaic acid, sebacic acid, undecandioic acid, dodecandioic acid and brassylic acid and mixtures thereof.

5. The biodegradable block copolymer according to claim 1, wherein said diol is selected from the group consisting of 1,2-ethandiol, 1,2-propandiol, 1,3-propandiol, 1,4-butandiol, 1,6-hexandiol, 1,7-heptandiol, 1,8-octandiol, 1,9-nonandiol, 1,10-decandiol, 1,11-undecandiol, 1,12-dodecandiol, 1,4-cyclohexandimethanol, neopentylglycol, 2-methyl-1,3-propandiol, dianhydrosorbitol, dianhydromannitol, dianhydroiditol, cyclohexandiol, cyclohexanmethanol and mixtures thereof.

6. The biodegradable block copolymer according to claim 1, comprising an unsaturated comonomer of either natural or synthetic origin in an amount within the range of 0.5 to 45% based on the sum of the amounts of dicarboxylic acid/diol.

7. The biodegradable block copolymer according to claim 6, wherein the synthetic origin unsaturated comonomer is selected from the group consisting of malonic acid, fumaric acid, vinyl acetate, acrylic acid, methacrylic acid, hydroxyalkylacrylate and hydroxyalkylmethacrylate, and the natural origin unsaturated comonomer is selected from the group consisting of itaconic acid, monounsaturated hydroxyacid, and mono-, or polyunsaturated monocarboxylic acid.

8. The biodegradable block copolymer according to claim 1, comprising at least a hydroxy acid in an amount within the range of from 0 to 30% moles based on the moles of the aliphatic dicarboxylic acid, said hydroxy acid being selected from the group consisting of glycolic acid, hydroxybutyric acid, hydroxycaproic acid, hydroxyvaleric acid, 7-hydroxyheptanoic acid, 8-hydroxycaproic acid, 9-hydroxynonanoic acid and lactic acid and mixtures thereof.

9. The biodegradable block copolymer according to claim 1, comprising up to 50% moles, based on the total moles of dicarboxylic acid/diol, of an aromatic polyfunctional compound.

10. The biodegradable block copolymer according to claim 1, comprising one or more polyfunctional molecules, in an amount within the range of 0.1 to 3% moles based on the dicarboxylic acid, said molecules being selected from the group consisting of glycerol, pentaerythritol, trimethylolpropane, neopentyl glycol, citric acid, densipolic acid, auripolic acid, epoxydized soybean oil and castor oil.

11. The biodegradable thermoplastic block copolymer according to claim 1, wherein the amorphous polymer of the diacid/diol type, that originates the amorphous part of the copolymer, is characterized by $\Delta H \leq 30$ J/g and a $T_g$ lower than $-10°$ C.

12. The biodegradable thermoplastic block copolymer according to claim 1, wherein the amount of amorphous polymer is within the range of 5 to 65% based on the total amount of amorphous+crystalline polymer.

13. The biodegradable thermoplastic block copolymer according to claim 1, wherein the amount of amorphous polymer is within the range of 10 to 60% based on the total amount of amorphous+crystalline polymer.

* * * * *